(12) United States Patent
Biswas et al.

(10) Patent No.: US 8,339,991 B2
(45) Date of Patent: Dec. 25, 2012

(54) NODE SELF-CONFIGURATION AND OPERATION IN A WIRELESS NETWORK

(75) Inventors: Sanjit Biswas, San Francisco, CA (US); John Bicket, San Francisco, CA (US)

(73) Assignee: Meraki, Inc., San Francisco, CA (US)

( * ) Notice: Subject to any disclaimer, the term of this patent is extended or adjusted under 35 U.S.C. 154(b) by 262 days.

(21) Appl. No.: 12/039,520

(22) Filed: Feb. 28, 2008

(65) Prior Publication Data
US 2008/0304427 A1    Dec. 11, 2008

Related U.S. Application Data

(60) Provisional application No. 60/892,437, filed on Mar. 1, 2007, provisional application No. 60/892,432, filed on Mar. 1, 2007, provisional application No. 60/892,440, filed on Mar. 1, 2007, provisional application No. 60/892,443, filed on Mar. 1, 2007, provisional application No. 60/892,449, filed on Mar. 1, 2007.

(51) Int. Cl.
*H04L 12/28* (2006.01)
*H04L 12/66* (2006.01)
*H04W 4/00* (2009.01)
*G06F 15/16* (2006.01)
*G06F 15/173* (2006.01)
*G06F 15/177* (2006.01)

(52) U.S. Cl. ........ 370/254; 370/338; 370/401; 709/203; 709/220; 709/223; 709/230; 709/249

(58) Field of Classification Search .................. 370/255, 370/254, 338, 401; 709/203, 220, 223, 230, 709/249
See application file for complete search history.

(56) References Cited

U.S. PATENT DOCUMENTS

| 6,704,301 B2 | 3/2004 | Chari et al. |
| 6,728,232 B2 * | 4/2004 | Hasty et al. ................... 370/338 |
| 6,868,080 B1 | 3/2005 | Umansky et al. |
| 6,925,069 B2 | 8/2005 | Koos, Jr. et al. |
| 7,016,328 B2 | 3/2006 | Chari et al. |

(Continued)

FOREIGN PATENT DOCUMENTS

EP    1265397 A2    12/2002

(Continued)

OTHER PUBLICATIONS

Bicket, John, et al. "Architecture and Evaluation of an Unplanned 802.11b Mesh Network", *MobiCom'05*, Aug. 28-Sep. 2, 2005, Cologne, Germany, pp. 1-12.

(Continued)

*Primary Examiner* — Alpus H Hsu
(74) *Attorney, Agent, or Firm* — Blakely Sokoloff Taylor & Zafman LLP (57) ABSTRACT

A device performs a self-configure process for operations in a managed network to allocate a network address for the device by determining if the device will operate as a gateway of the managed network, obtaining a network address for communication with external devices outside of the managed network in response to determining that the device will operate as a gateway, scanning for neighbor devices operating in the managed network and maintaining a database of neighbor devices located in the scanning, and selecting a managed network to join based on the database of neighbor devices in response to determining that the device will operate as a node.

18 Claims, 6 Drawing Sheets

U.S. PATENT DOCUMENTS

| | | | |
|---|---|---|---|
| 7,444,158 B2 | 10/2008 | Shitama et al. | |
| 7,508,799 B2 | 3/2009 | Sumner et al. | |
| 7,526,538 B2 | 4/2009 | Wilson | |
| 7,554,959 B1* | 6/2009 | Dowling | 370/338 |
| 7,562,393 B2* | 7/2009 | Buddhikot et al. | 726/26 |
| 7,583,695 B2 | 9/2009 | Vimpari et al. | |
| 7,590,733 B2* | 9/2009 | Lum | 709/225 |
| 7,630,341 B2 | 12/2009 | Buddhikot et al. | |
| 7,650,148 B2* | 1/2010 | Kim et al. | 455/435.1 |
| 7,729,314 B2 | 6/2010 | Siddiqi et al. | |
| 7,881,267 B2* | 2/2011 | Crosswy et al. | 370/338 |
| 2001/0024953 A1 | 9/2001 | Balogh | |
| 2002/0006788 A1 | 1/2002 | Knutsson et al. | |
| 2002/0141390 A1 | 10/2002 | Fangman et al. | |
| 2003/0084162 A1 | 5/2003 | Johnson et al. | |
| 2003/0095520 A1 | 5/2003 | Aalbers et al. | |
| 2003/0142641 A1 | 7/2003 | Sumner et al. | |
| 2003/0169713 A1 | 9/2003 | Luo | |
| 2003/0179750 A1* | 9/2003 | Hasty et al. | 370/390 |
| 2004/0141522 A1 | 7/2004 | Texerman et al. | |
| 2004/0253970 A1 | 12/2004 | Kunihiro | |
| 2004/0264395 A1* | 12/2004 | Rao | 370/311 |
| 2005/0059396 A1 | 3/2005 | Chuah et al. | |
| 2005/0060364 A1* | 3/2005 | Kushwaha et al. | 709/200 |
| 2005/0229238 A1* | 10/2005 | Ollis et al. | 726/4 |
| 2005/0246769 A1 | 11/2005 | Bao et al. | |
| 2005/0259598 A1 | 11/2005 | Griffin et al. | |
| 2006/0009246 A1 | 1/2006 | Marinier et al. | |
| 2006/0014562 A1 | 1/2006 | Syrtsov et al. | |
| 2006/0015579 A1 | 1/2006 | Sastri et al. | |
| 2006/0053216 A1 | 3/2006 | Deokar et al. | |
| 2006/0089964 A1 | 4/2006 | Pandey et al. | |
| 2006/0155833 A1 | 7/2006 | Matsuda et al. | |
| 2006/0187873 A1* | 8/2006 | Friday et al. | 370/328 |
| 2006/0200543 A1* | 9/2006 | Kong et al. | 709/223 |
| 2006/0209714 A1 | 9/2006 | Ackermann-Markes et al. | |
| 2006/0291443 A1* | 12/2006 | Harrington et al. | 370/351 |
| 2007/0002833 A1 | 1/2007 | Bajic | |
| 2007/0019631 A1* | 1/2007 | Jang | 370/352 |
| 2007/0064661 A1* | 3/2007 | Sood et al. | 370/338 |
| 2007/0156813 A1 | 7/2007 | Galvez et al. | |
| 2007/0253344 A1* | 11/2007 | Frost et al. | 370/254 |
| 2007/0276926 A1 | 11/2007 | LaJoie et al. | |
| 2007/0286393 A1 | 12/2007 | Roever et al. | |
| 2008/0095180 A1 | 4/2008 | Vucina et al. | |
| 2008/0205415 A1* | 8/2008 | Morales | 370/401 |
| 2008/0225806 A1* | 9/2008 | Arian et al. | 370/338 |
| 2009/0176509 A1 | 7/2009 | Davis et al. | |
| 2010/0265845 A1* | 10/2010 | Lampen | 370/254 |

FOREIGN PATENT DOCUMENTS

| | | |
|---|---|---|
| EP | 1473900 A2 | 11/2004 |
| WO | WO03/079709 A1 | 9/2003 |
| WO | WO2006/046261 A | 5/2006 |
| WO | WO2006/121465 A1 | 11/2006 |

OTHER PUBLICATIONS

Buddhikot, M.M., et al. "Integration of Wireless LAN and 3G Wireless—Design and Implementation of a WLAN/CDMA2000 Interworking Architecture",*IEEE Communications Magazine* (Nov. 2003) vol. 41(11):99-100.

Caltech and Partners: "Application Monitoring API" [Online] Dec. 23, 2005, pp. 1-2, retrieved from the Internet at URL:http//monalisa.cacr.caltech.edu/monalisa_Service_Applications_ApMon.html> on Jul. 29, 2008.

"Changing Your MAC Address in Window XP/Vista, Linux and Mac OS X (Sometimes known as MAC spoofing)", retrieved from the Internet on Feb. 27, 2007 at [http://www.irongeek.com/i.php?page=security/changemac&mode=print], pp. 1-4.

Comer, D. *Internetworking with TCP/IP* (1995), Prentice Hall, USA, pp. 61-62, paragraph 4.5.

Congdon, P.(Hewlet Packard Company), et al. "IEEE 802.1X Remote Authentication Dial in User Service (RADIUS) Usage Guidelines", *IEFT Standard, Internet Engineering Task Force* (Sep. 2003) pp. 1-30.

Griffiths, Rob "Set newer portable Macs' sleep mode", posted at Macworld: MAC OS X Hints, on Oct. 19, 2006, retrieved from the Internet on Feb. 27, 2007 at [http://www.macworld.com/weblogs/macosxhints/2006/10/sleepmode/index.php?pf=1].

Konstantinou, A., NetCallback 1.3.1 Forwarding TCP and UDP ports behind a firewall [Online] 2001, pp. 1-5, retrieved from the Internet at URL:http://netcallback.sourceforge.net/> on Jul. 29, 2008.

Krag, Thomas, et al. "Wireless Mesh Networking", posted at Wireless DevCenter on Jan. 22, 2004, retrieved from the Internet at [http://www.oreillynet.com/lpt/a/4535] on Feb. 27, 2007, pp. 1-9.

"No Internet With New Router, Computer, or Adapter: MAC Spoofing", posted at Netgear, retrieved from the Internet on Feb. 27, 2007 at [http://kbserver.netgear.com/kb_web_files/n101227.asp], p. 1.

Roch, Stephane "Nortel's Wireless Mesh Network solution: Pushing the boundaries of traditional WLAN technology", Nortel Technical Journal (Jul. 2005) Issue 2, pp. 18-23.

"The Linksys BEFSR41 Etherfast Cable/DLS Router", posted at *Network Lab—A Guide to Networking an NTL Cable Modem*, retrieved from the Internet on Feb. 27, 2007 at [http://www.networklab.co.uk/cmodem/linksys.html].

Wang, et al. "Global Connectivity for Mobile IPv6-based Ad Hoc Networks", *Proceedings of the 19th International Conference on Advanced Information Networking and Applications (AINA'05)* (Mar. 2005), vol. 2:807-812.

RFC 2131, Dynamic Host Configuration Protocol, Mar. 1997, retrieved from the internet <tools.ietf.org/pdf/rfc2131.pdf>, pp. 1-46.

Non-Final Office Action, U.S. Appl. No. 12/039,539, dated Aug. 18, 2011, 18 pages.

International Preliminary Report on Patentability, Application No. PCT/US2008/055419, dated Sep. 1, 2009, 7 pages.

International Search Report and Written Opinion, Application No. PCT/US2008/055419, dated Aug. 12, 2008, 9 pages.

International Preliminary Report on Patentability, Application No. PCT/US2008/055414, dated Sep. 1, 2009, 12 pages.

International Search Report and Written Opinion, Application No. PCT/US2008/055414, dated Oct. 14, 2008, 15 pages.

International Preliminary Report on Patentability, Application No. PCT/US2008/055415, dated Sep. 1, 2009, 7 pages.

International Search Report and Written Opinion, Application No. PCT/US2008/055415, dated Sep. 3, 2008, 9 pages.

International Preliminary Report on Patentability, Application No. PCT/US2008/055416, dated Sep. 1, 2009, 6 pages.

International Search Report and Written Opinion, Application No. PCT/US2008/055416, dated Jul. 28, 2008, 7 pages.

International Preliminary Report on Patentability, Application No. PCT/US2008/055424, dated Sep. 1, 2009, 7 pages.

International Search Report and Written Opinion, Application No. PCT/US2008/055424, dated Aug. 19, 2008, 9 pages.

Final Office Action, U.S. Appl. No. 12/039,509, dated Jan. 4, 2011, 15 pages.

Non-Final Office Action, U.S. Appl. No. 12/039,509, dated Jun. 1, 2010, 12 pages..

Non-Final Office Action, U.S. Appl. No. 12/039,530, dated Sep. 1, 2009, 16 pages.

Notice of Allowance, U.S. Appl. No. 12/039,530, dated Jun. 22, 2010, 8 pages.

Notice of Allowance, U.S. Appl. No. 12/039,530, dated Aug. 5, 2010, 8 pages.

Non-Final Office Action, U.S. Appl. No. 12/039,557, dated Sep. 1, 2010, 18 pages.

Non-Final Office Action, U.S. Appl. No. 12/039,557, dated Jan. 5, 2012, 19 pages.

Final Office Action, U.S. Appl. No. 12/039,557, dated May 25, 2011, 14 pages.

* cited by examiner

NODE SELF-CONFIGURATION AND OPERATION IN A WIRELESS NETWORK

CROSS-REFERENCES TO RELATED APPLICATIONS

This application claims the benefit of U.S. Provisional Application Ser. No. 60/892,437 entitled "Node Self-Configuration and Operation in a Wireless Network" by Sanjit Biswas et al., filed Mar. 1, 2007, and the benefit of the following co-pending U.S. Provisional Applications: entitled "System and Method For Hosted Network Management", by S. Biswas, et al., Ser. No. 60/892,432, filed Mar. 1, 2007; entitled "Client Operation for Network Access" by Thomer M. Gil et al., Ser. No. 60/892,440, filed Mar. 1, 2007; entitled "System and Method for Remote Monitoring and Control of Network Devices" by S. Biswas et al., Ser. No. 60/892,443, filed Mar. 1, 2007; entitled "Client Addressing and Roaming in a Wireless Network" by Thomer M. Gil et al., Ser. No. 60/892,449, filed Mar. 1, 2007. Priority of the filing dates is hereby claimed, and the disclosures of the Provisional Applications are hereby incorporated by reference.

BACKGROUND

Wireless mesh networks include at least one node that connects to a wide area network (WAN) and one or more wireless access points comprising nodes of the mesh network that communicate with each other, at least one of which communicates with the wide area network node. The WAN can comprise, for example, the Internet, and the WAN node typically comprises a cable interface (cable modem) or DSL interface or the like, and the wireless access points typically comprise wireless routers and the like. Wireless mesh networks are convenient because they can be implemented with little or no effort to provide infrastructure. For example, it is generally not necessary to install additional cabling for access to the wide area network. Once a connection to the WAN is provided, the additional wireless access points can be configured to communicate and thereby provide network access whose geographic coverage is theoretically limited only by the distribution of the wireless access points of the mesh network.

In practical terms, network management of such mesh networks can be very complicated and can require a relatively high level of skill in network communications and protocols. A mesh network owner typically has ownership of the mesh network nodes and usually has responsibility for ensuring access to the WAN through the WAN node. The mesh network owner generally receives WAN access through a subscription arrangement with a provider, such as an Internet service provider (ISP). To initiate network communications with the WAN, the WAN node must be properly configured by the network owner with service parameters of the ISP. Once network access is established to the WAN, the network owner must configure each of the wireless access points. Such configuration is not a trivial task. The configuration process can involve knowledge of the hardware and software configuration of the mesh network devices, as well as familiarity with network configuration and addresses, security settings, network protocols, hardware configuration, encryption algorithms. Determining the needed information and determining the process for providing such information to appropriate vendors, and actually entering such information, can be complicated and time consuming.

Even after the mesh network has been set up and configured, the actual management and maintenance of the network can be even more complicated and time consuming. Clients that want to use the mesh network must be identified to the WAN node, allocated a network address, and initiate gaining access. The network nodes (routers) must be maintained for proper configuration and performance. Network conditions must be monitored for proper functioning and to identify performance issues, such as bandwidth availability and quality of service. Other management tasks, such as account management, user information, and access control and billing, must be performed.

A variety of network management tools are available to assist with the concerns described above. Conventional tools, however, generally address only limited aspects of the mesh network environment. Configuring the mesh network nodes can still be a complicated task that usually requires determining input parameters for the network that is being implemented and entering the parameters. Adding a network node also can be a complicated task that requires repeating many of the steps performed in setting up the network initially. Because such configuration tasks must be repeated for each network node, such configuration techniques do not scale well and severely limit the practical size of networks implemented in this fashion.

Thus, there is a need for more convenient setup, configuration, and maintenance of network nodes in wireless mesh networks. The present invention satisfies this need.

SUMMARY

Described herein is a self-configure process for a device such that the device can operate in a managed network. In accordance with the self-configuration, the device is allocated a network address by determining if the device will operate as a gateway of the managed network, obtaining a network address for communication with external devices outside of the managed network in response to determining that the device will operate as a gateway, scanning for neighbor devices operating in the managed network and maintaining a database of neighbor devices located in the scanning, and selecting a managed network to join based on the database of neighbor devices in response to determining that the device will operate as a node. In this way, more convenient setup, configuration, and maintenance of network nodes in wireless mesh networks is provided.

Other features and advantages of the present invention should be apparent from the following description of the preferred embodiments, which illustrate, by way of example, the principles of the invention.

DETAILED DESCRIPTION

A. Hosted Network

Figure 1:
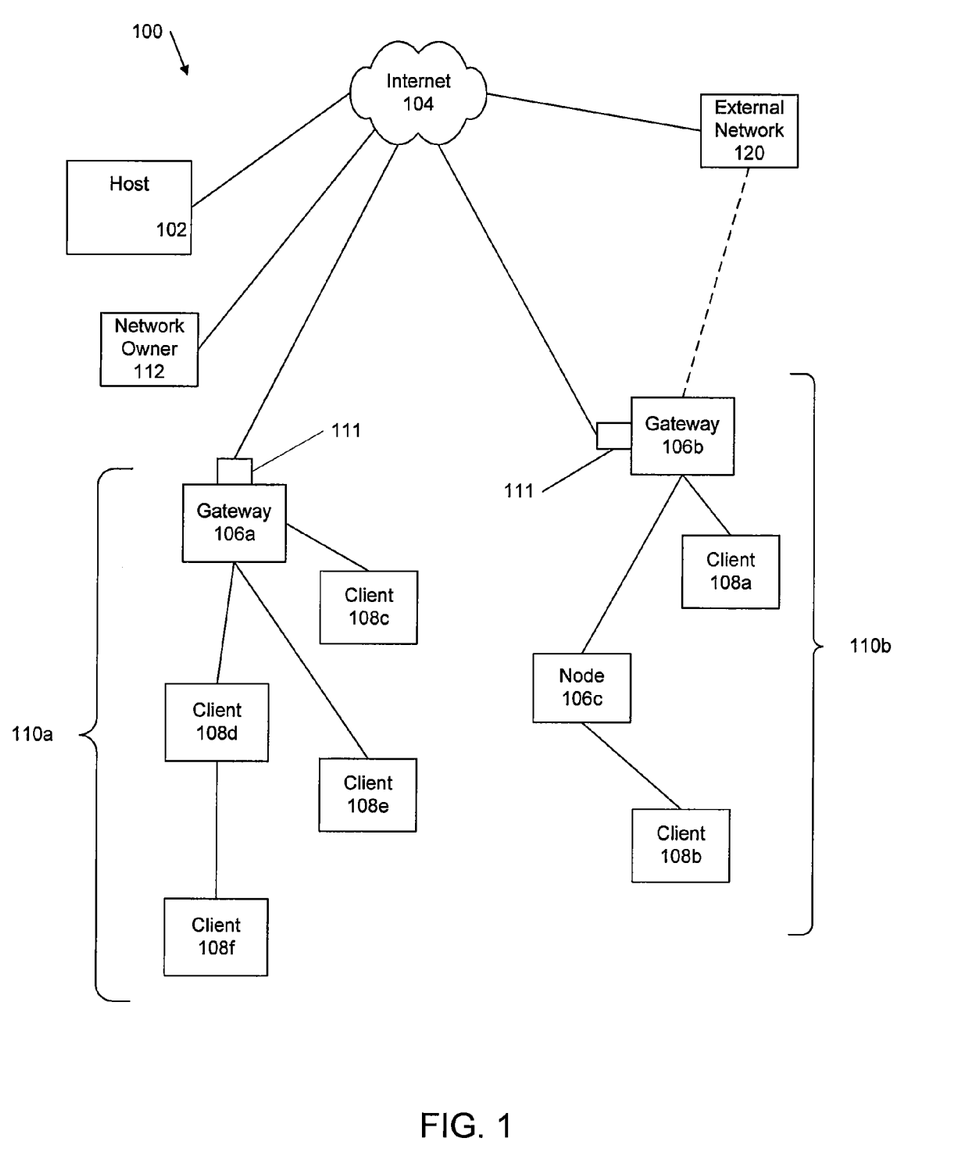
FIG. 1 is a block diagram representation of a hosted network 100 constructed in accordance with the invention.

FIG. 1 is a block diagram representation of a hosted network 100 constructed in accordance with the invention. The hosted network 100 includes a host 102 that communicates over a network infrastructure 104, such as the Internet, with multiple communication devices 106, 108. The communication devices include network traffic devices 106, such as access points or routers, and client devices 108, such as laptop computers, desktop computers, and portable computing devices, all of which are capable of communicating with each other using a network communications protocol specification. In FIG. 1, particular communication devices 106, 108 are designated with a letter suffix ("a", "b", etc.). Particular devices will be referenced by their respective suffix 106a, 106b, 106c and 108a, 108b, . . . , 108f. References to the devices 106, 108 without their particular suffix will be understood to be a reference to the group collectively.

All of the devices 106, 108 are capable of communicating with each other over a wireless network communications protocol specification, such as the 802.11x family specification of the IEEE, also referred to as "wireless broadband" or "WiFi". The devices 106, 108 define a managed network 110 whose member devices communicate with the host computer 102, also referred to as the backend server. The managed network 110 includes component local mesh networks that are identified with a letter suffix ("a" or "b") so that references to the local networks without their suffix are references to the local networks collectively as the managed network. When it is necessary to refer to a particular local network 110a, 110b, the suffix identifier will be used.

The traffic devices 106 in FIG. 1 that are designated as gateways 106a, 106c serve as an interface between the WAN (Internet) 104 and their respective local wireless mesh networks 110a, 110b. FIG. 1 shows each gateway as having an interface device 111 interposed between itself and the Internet 104. That is, the interface device is upstream of the gateway. Those skilled in the art will understand details of such devices, which may comprise cable modems, DSL interfaces, and the like. Alternatively, the interface may be incorporated into the gateway device rather than being a separate component. Each gateway provides an interface between its respective mesh network and the Internet. For example, the gateway 106a is the Internet interface for the mesh network 110a comprising 106a and client 108c, client 108d, client 108e, and client 108f. The gateway 106b is the Internet interface for the mesh network 110b comprising gateway 106b, node 106c, client 108a, and client 108b. The gateways 106a, 106b communicate with the host 102 of the managed network and perform network address translation (NAT) functions for the devices 106, 108 within their respective managed networks 110a, 110b.

The mesh network 110 is operated under the control of a network owner 112, who can access management tools through a network portal interface of the host 102. Therefore, the network owner 112 is illustrated in FIG. 1 as being connected to the Internet 104, whereby the network owner using a computer or similar device can access a Web portal at the host 102 via a conventional Web browser. For the discussion herein, a reference to a "managed network" will be understood to be a reference to a local network having network traffic devices that operate according to the description and drawings herein under management of a network owner 112 through a service portal of the host 102.

The gateway devices 106a, 106b are also capable of network communications via a wired connection, such as Ethernet. The clients 108 can also have this dual capability. Thus, the managed networks 110a, 110b can include devices that are capable of communicating over both wired connections and wireless connections. In this discussion, the traffic devices 106 will also be referred to as routers or nodes of the managed networks. Thus, nodes as used herein comprise devices that can communicate over the managed networks 110 and can send data messages from other nodes toward destinations outside of the managed network, such as over the Internet 104 toward the host 102.

FIG. 1 shows that the network traffic devices (nodes) 106 can be provided with the ability to communicate with external networks that are outside of any of the managed networks 110. Thus, a dotted line represents a connection from the second gateway 106b to an external network 120. The external connection between the two 106b, 120 can comprise a wired connection or a wireless connection. The external network can comprise a connection to the Internet or a local network that does not share the client addressing scheme of the managed networks 110a, 110b and therefore comprises a heterogeneous network relative to the managed networks.

B. Network Setup

The network traffic devices 106 are configured so as to operate in accordance with the present invention for self-configuration and communication with the host 102. The devices 106 can be configured, for example, with special operating software and/or firmware. Before the mesh network is initially deployed or launched, the network owner 112 completes a registration process with the host 102. For example, the host may provide management tools and reporting information to the network owner on a subscription basis. The registration ensures that appropriate contact and billing information concerning the network owner 112 is obtained by the host 102.

As part of the registration process, the network owner will indicate the number of traffic devices 106 that will be deployed. The network owner typically will provide the geographic location where each traffic device will be located, such as by providing a street address and potentially other more specific information, such as office number or apartment number. The network traffic devices 106a, 106b, 106c can be delivered to the network owner as configured devices with memory of each device containing its respective location information as received from the network owner during registration. Alternatively, the devices themselves could be provided with location-determining components to self-report their location, such as GPS-based mechanisms and the like. In another alternative embodiment, the registration process could be performed by the network owner through a suitable user interface, whereby the network owner can provide the location of each device. The latter implementation, however, requires greater involvement and skill on the part of the network owner, as compared with delivering fully configured devices to the network owner.

After the registration information is received from the network owner and the number of devices to be deployed is known, the host provides the requested number of traffic devices to the network owner, with each device configured as noted herein for self-configuration and reporting. Upon receiving the configured traffic devices, the network owner can set about deploying them as planned. As each device is physically placed in a geographic location and power is applied, the device will perform self-configuration, as described below in conjunction with FIG. 2.

C. Network Operation

Figure 2:
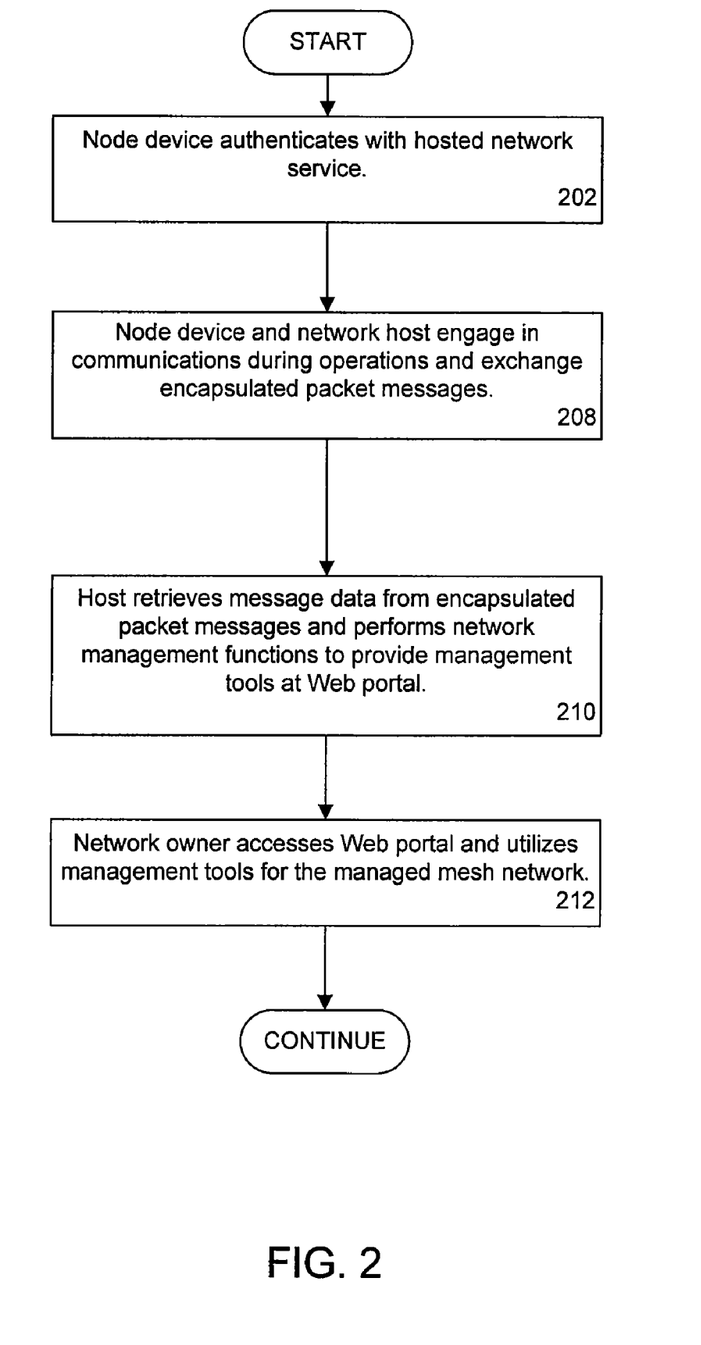
FIG. 2 is a flowchart that illustrates processing of the network in the FIG. 1 system.

FIG. 2 is a flowchart that illustrates operation of the network in accordance with the invention. As described further below, each node device 106 upon start up carries out operations that comprise self-configuration processing, by which the node device becomes part of the mesh network 110 (see FIG. 1). In the first network operation, represented by the FIG. 2 flow diagram box numbered 202, a node device authenticates with the hosted network service at the network host. The node device can comprise one of the gateways or nodes. Those skilled in the art will understand that the authentication process 202 involves a connection message that comprises a request from the node device for a network address in the managed network 110. More particularly, the request is for an internal network address for communications within the mesh network 110. In the illustrated embodiment, the connection message is sent with the username set to the device MAC address as described herein and the password is set to the serial number of the router that is being authenticated. Also at box 202, the host determines if the requesting node device is associated with device registration data in the managed network that identifies a network owner and, if the requesting node device is a registered device, then the host returns a network address allocation message to the requesting node device. This operation completes a self-configuring process of the node device for communications with the network host and establishes the hosted network associated with the identified network owner.

Additional authentication processing at box 202 involves the host periodically receiving authentication messages from the node device such that the network host can determine a mapping of the network address to the registered device. The host responds to the authentication message with an acknowledgement message. The acknowledgement message maintains a persistent network connection path from the network host to the node device. At box 208, the network host and node device participate in sending and receiving encapsulated packet messages, the encapsulated packet messages comprising packet messages of the message protocol appended with header information of the hosted network. The network host, at box 210, retrieves message data from encapsulated packet messages it receives from the node device and performs network management operations to provide the management tools. As noted above, the management tools are provided via a user management interface such as a Web portal that is accessed by the identified network owner through a conventional Web browser. At box 212, the network owner accesses the network management tools via the Web portal that is provided by the host.

D. Node Operation

Upon startup, a node device can either configure itself as a gateway via a wired connection to the Internet, or the node device can join an existing network of nodes and communicate with the nodes in the network via multi-hop forwarding. A node will first perform the connection and address allocation operations 202, 204 described above with reference to FIG. 2. To automatically configure itself, a node must perform the following high-level tasks: (1) determine whether it is a gateway (via a DHCP request), (2) perform a scan via wireless communication to discover surrounding access points, (3) use the results from the scan to determine the node's behavior as a gateway or to determine which existing network to join, and (4) derive an IP address to be used within the mesh network 110.

The operation of a traffic device upon start or application of power will be understood with reference to the description below and to the flowchart of FIG. 3, which illustrates the operation of a node in the mesh network 110.

1. Node Configuration on Bootup

Initially, a node device must determine whether it should behave as a gateway or join an existing network. To do so, the node device must (1) initialize its Ethernet interface through a wired connection, or (2) attempt to obtain an IP address (used to address the node outside of the mesh) by broadcasting its MAC address (hardware ID) in a DHCP request over Ethernet. The decision box 302 in FIG. 3 shows that the device initially scans for surrounding wireless access points to see which channels are in use and which channels are available, then chooses its channel of operation. Next, at box 304, the device requests a DHCP address assignment from the host server 102 (FIG. 1). If the device is connected to the Internet through an Ethernet connection, then the host server will respond with a valid IP assignment, an affirmative outcome at the decision box 306. The device can then operate as a gateway, indicated at box 308. Operation as a gateway is described further below. If the node device receives no response from a DHCP server after a short timeout (e.g. 20 seconds), a negative outcome at box 306, then the node will join an existing managed network and will operate as a wireless access point. Such processing is described further below.

2. Determining Node IP Address

For operation as a managed network, whether as a gateway or as an access point, the system 100 provides a hash-based network address allocation scheme, by which the system can use multiple network uplinks and still maintain seamless client roaming with zero-configuration. As noted above with reference to FIG. 2, at startup a node will first perform connection and address allocation operations 202, 204 to be allocated a network address for communications within the managed network 110. The network 110 uses an automatic address allocation system, where all devices hash their hardware MAC address to derive their network (IP) address. These network addresses lie in an unallocated/reserved Class A address space, and each of the network gateways performs network address translation (NAT) to map their single uplink IP address to the address space of the network 100. This construction provides beneficial characteristics. First, heterogeneous network uplinks can be used within in a single mesh network, because IP addresses are assigned consistently regardless of external addresses. The set of network uplinks can even change without requiring address re-allocation. Secondly, client devices can freely roam within the network (and can switch between network uplinks) without needing to renew their IP addresses. The network automatically determines which network uplink to use for a given connection, and automatically updates routing tables as clients move through a network. Thirdly, because there is no DHCP server for address allocation, there is no single source of failure for address allocation.

For example, a device configured for operation as a node in the managed network 100 will generally have a MAC address in the following format: 00:18:0A:xx:yy:zz (xx, yy, zz are hexadecimal values and are the three least significant bytes of the MAC address). The corresponding intra-mesh IP address for the node will have an address in the following format: 127:xx':yy':zz' (where xx'=decimal equivalent of xx, yy'=decimal equivalent of yy, and zz'=decimal equivalent of zz). In this way, a network address for communications within the managed network 110 is allocated by performing a hash function on the MAC address of the device such that the hash function provides a hashed network address that is unique to the device and that is obtained identically each time the hash function is performed.

These considerations will be more clearly understood in conjunction with the following brief example. Imagine a mesh network with two network uplinks, a cable and a DSL modem. The cable modem's IP address is 1.1.1.1, and the DSL modem's address is 2.2.2.2. Each device in the managed network 100 has an IP addresses in the of the form 127.x.x.x, where x.x.x is a result of a 24-bit hash function over the device's MAC address (e.g. 00:11:22:33:44:55→127.13.55.212). Routers in the managed network derive addresses the same way, so the cable modem can fail or switch addresses without affecting the mesh.

Other systems are known that use a scheme in which mesh routers' IP addresses are the bottom 24-bits of their hardware MAC address. See, for example, the Roofnet project at the Massachusetts Institute of Technology. However, in such systems, client devices are assigned addresses through a DHCP server, so the client devices cannot freely roam within the network, and the lack of hash function leads to more frequent address collisions. Thus, the system of the present invention supports multiple heterogeneous uplinks.

3. Node as a Gateway

Figure 3:
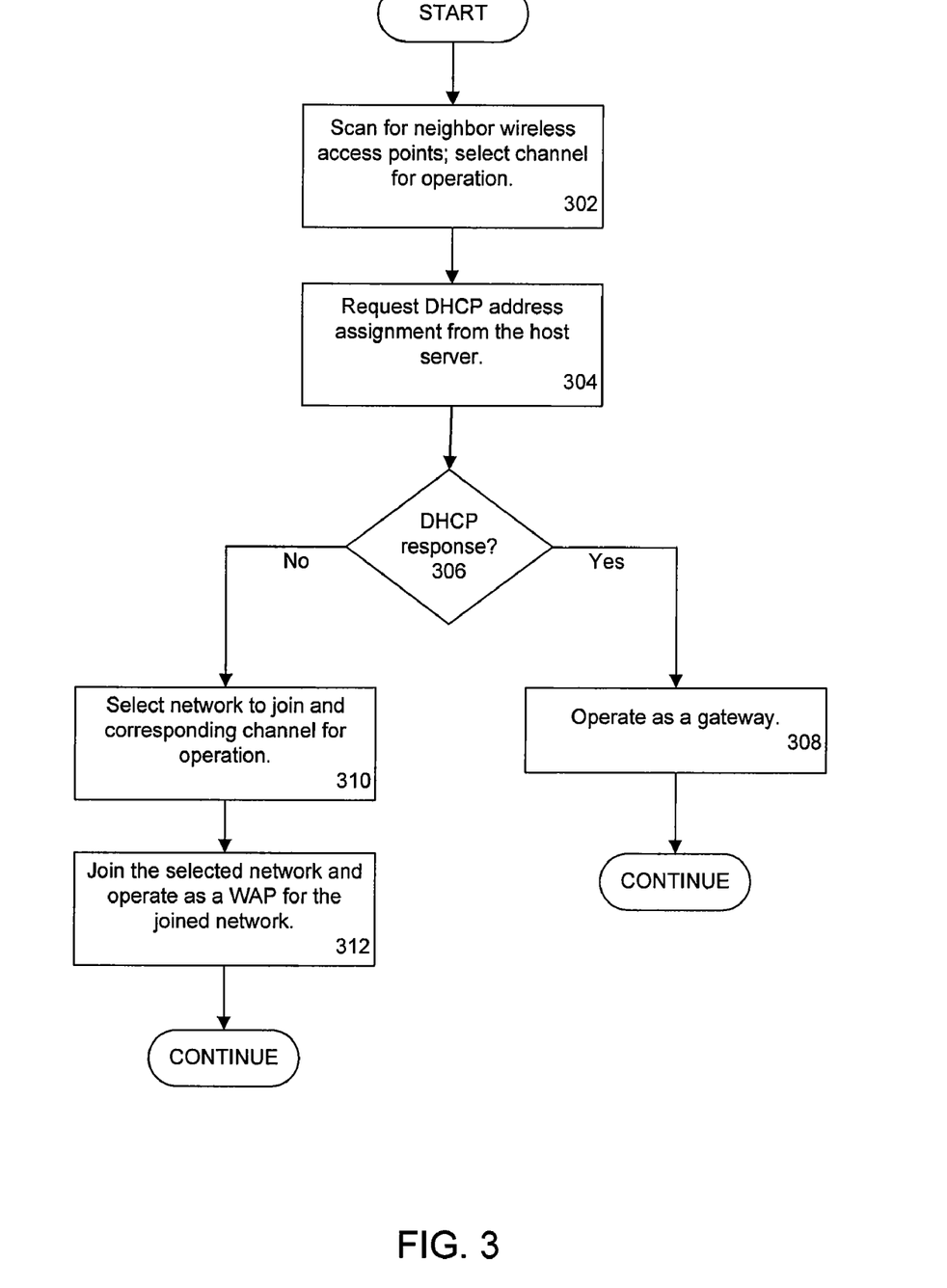
FIG. 3 is a flowchart that illustrates processing of a node in the FIG. 1 system.

After the node has received an IP address from the DHCP server at box 308 of FIG. 3, the node will operate as a gateway of the managed network 110. During operation as a gateway, the device will periodically broadcast messages with a special code to indicate that it is acting as a gateway. In the illustrated embodiment, an IS_GW (gateway) bit in an encapsulated message is set. In addition, during operation as a gateway, the device will periodically attempt to renew its DHCP lease by confirming the validity of its IP with the DHCP server (i.e., the host server). This background checking operation comprising a DHCP request is carried out as operation of a gateway of the managed network 308. If the device confirms the DHCP lease (such as by receiving a DHCP response to a DHCP request), then it continues to operate as a gateway as at box 308. If the device acting as a gateway fails to renew its DHCP lease, then the device takes down its wireless interface (that is, it ceases to operate as a gateway), and instead scans for a network to join. Ceasing operation as a gateway and joining a network are indicated by the dashed line from the box 308 to the network box 310. Additional details of gateway and network processing are described further in the related application entitled "System and Method for Hosted Network Management" 60/892,432 filed with the present application.

4. Scan Operation for Wireless Networks

As noted above, at box 302 of FIG. 3, the device perform a scan. As part of such operation, the device builds a list of surrounding wireless access points by scanning each wireless channel and aggregating responses from access points operating on each channel. If the device operates as a gateway, it will use the list to determine its channel of operation. If the device is attempting to join an existing wireless network, it will use the list to determine the best existing network and join it.

Figure 4:
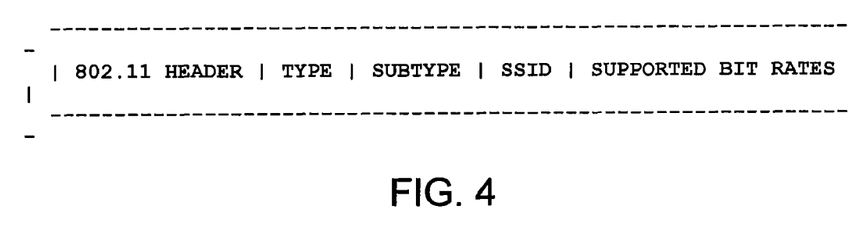
FIG. 4 is a diagram showing the probe request packet configuration for a message sent by the node.

A device performs its scan by scanning each channel twice (approximately 20-40 ms per channel), and performs periodic scans at predetermined intervals (such as every 10-15 seconds) thereafter. To perform a scan request, a node broadcasts an 802.11 management probe request, with the SSID in the payload set to zero. The probe request packet has a message configuration that includes an 802.11 header, a type field for the managed network, a subtype field, an SSID field, and a bit rate field. FIG. 4 shows the configuration of a probe request packet that is produced by the node device performing a scan. In the scan request packet, the message type field is set to "management", the subtype field is set to "probe request", and the SSID field is set to zero. The SSID is set to zero so that any nearby access points will respond to the probe request message.

Figure 5:
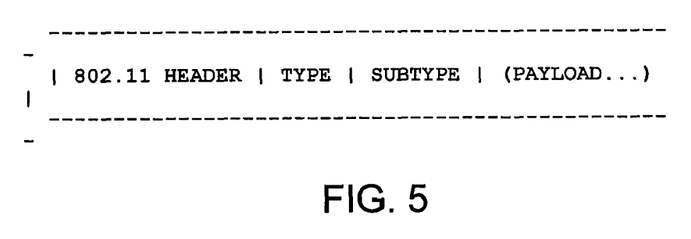
FIG. 5 is a diagram showing the probe response packet configuration for a message sent by the node.
Figure 6:
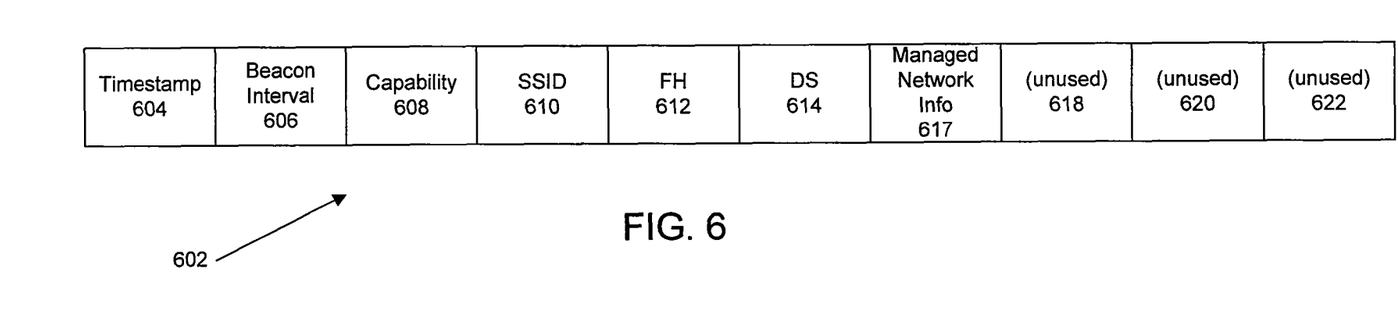
FIG. 6 is a diagram showing the probe response payload configuration for the probe response packet of FIG. 5.

In response to the scan message, any nearby access point will provide a management probe response message as illustrated in FIG. 5. The response packet includes the 802.11 header field, a type field, a subtype field, and a message payload. The type field is set to "management" and the subtype field is set to "probe response". The message payload includes information that identifies whether the responding device is a member of a network 100 that is being managed in accordance with the present invention. In particular, the payload will include TLV (type, length, value) elements in the probe response payload that properly configured receiving devices will recognize as indicated managed network operation. FIG. 6 shows details of the payload 602, including data fields for timestamp 604, a beacon interval 606, capability indicator 608, respondent SSID 610, FH parameter 612, DS parameter 614 that indicates the respondent's channel of operation, and a managed network information field 616. Additional data fields 618, 620, 622 are available for use, but currently are not used and are reserved for future use. Those skilled in the art will recognize that these data fields correspond to data fields of the 802.11 beacon frame message.

Figure 7:
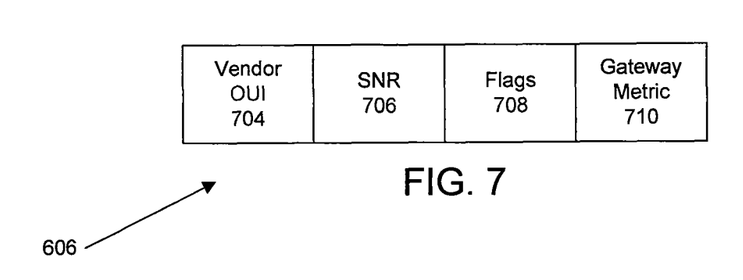
FIG. 7 is a diagram showing the Meraki Info field of the probe response payload of FIG. 6.

With the received payload information, the node devices build a list of access points that make up the mesh network 110. A node device builds a list of nearby access points with an identifier corresponding to the network as a result of its wireless scans on each channel. FIG. 7 shows details of the Managed Network Information field 616 in the response payload 602. The "Managed Network" refers to the mesh network devices 110 that together with the host 102 form the managed network 100 as described herein. The fields in FIG. 7 include a Vendor OUI field 704 that corresponds to the Organizationally Unique Identifier of the host. In the system described herein, the vendor OUI field is set to 00:18:0A, which is the OUI for Meraki Networks, Inc., the assignee of the present invention. The SNR field 706 contains data for the signal-to-noise ratio as observed and measured by the respondent. The flags field 708 includes at least two flag values, comprising an IS_GW flag that, if set to a non-zero value, indicates that the respondent node is a gateway of the managed network, and an IS_MERAKI flag that, if set to a non-zero value, indicates that the respondent is a node in a network that is managed in accordance with the invention. It should be apparent that all gateways of the managed network are also nodes of the managed network, but not all nodes are gateways.

The gateway metric field 710 is a performance heuristic or metric for a respondent node. For example, the gateway metric may comprise a one-byte value indicating the estimated transmission time from the sender to the respondent node. A responding node may derive the estimated transmission time by sending message packets at regular intervals, such as every few minutes, and checking for packet loss at the receiving node. The responding node can then calculate an expected time for successful packet transmission to the destination, based on the experienced packet loss. Those skilled in the art will be aware of other useful gateway metrics and techniques for calculation.

Using the payload information 606, the node maintains the access point list with the following properties for each neighboring access point: MAC Address; SSID; SNR in both directions (e.g. when a node A issues a probe request received by node B, the node B includes the A-to-B SNR in its probe response, and when node A receives node B's probe response, node A will also know the B-to-A SNR); the IS_GW value, the IS_MERAKI value, and the gateway metric value.

5. Joining an Existing Network

As noted above in connection with FIG. 3, a node may not have an Ethernet connection to the Internet, and then the node will not be able to operate as a gateway. In the managed network 100, if at any time a node does not operate as a gateway, the node will use the list of available access points that it maintains from its scans to choose the network with the best performance heuristic and will join it. To determine the network to join, the node will: (1) filter the list of access points based on a threshold Signal-to-Noise ratio; (2) sort the filtered list of access points by Gateway metric; (3) Choose the operating channel (e.g. the channel of the access point with the best Gateway metric); (4) Join the mesh network by operating on the selected channel, and broadcast the node's own SSID to find its neighbors.

In accordance with the invention, the network host 102 provides management tools to assist a network owner 112. The network owner can access the management tools from any network connection that supports communication with the host 102. For example, the network owner can access the management tools through any Internet connection. In the illustrated embodiment, the management tools are provided through a user interface that is accessed through a conventional Web browser. That is, the management tools can be accessed through a Web portal such that the network owner can provide identification information such as user name and password for authentication. The Web portal then permits selection of the various management tools through which the network owner manages the mesh network 110. A variety of management tools can be provided, such as described next.

Figure 8:
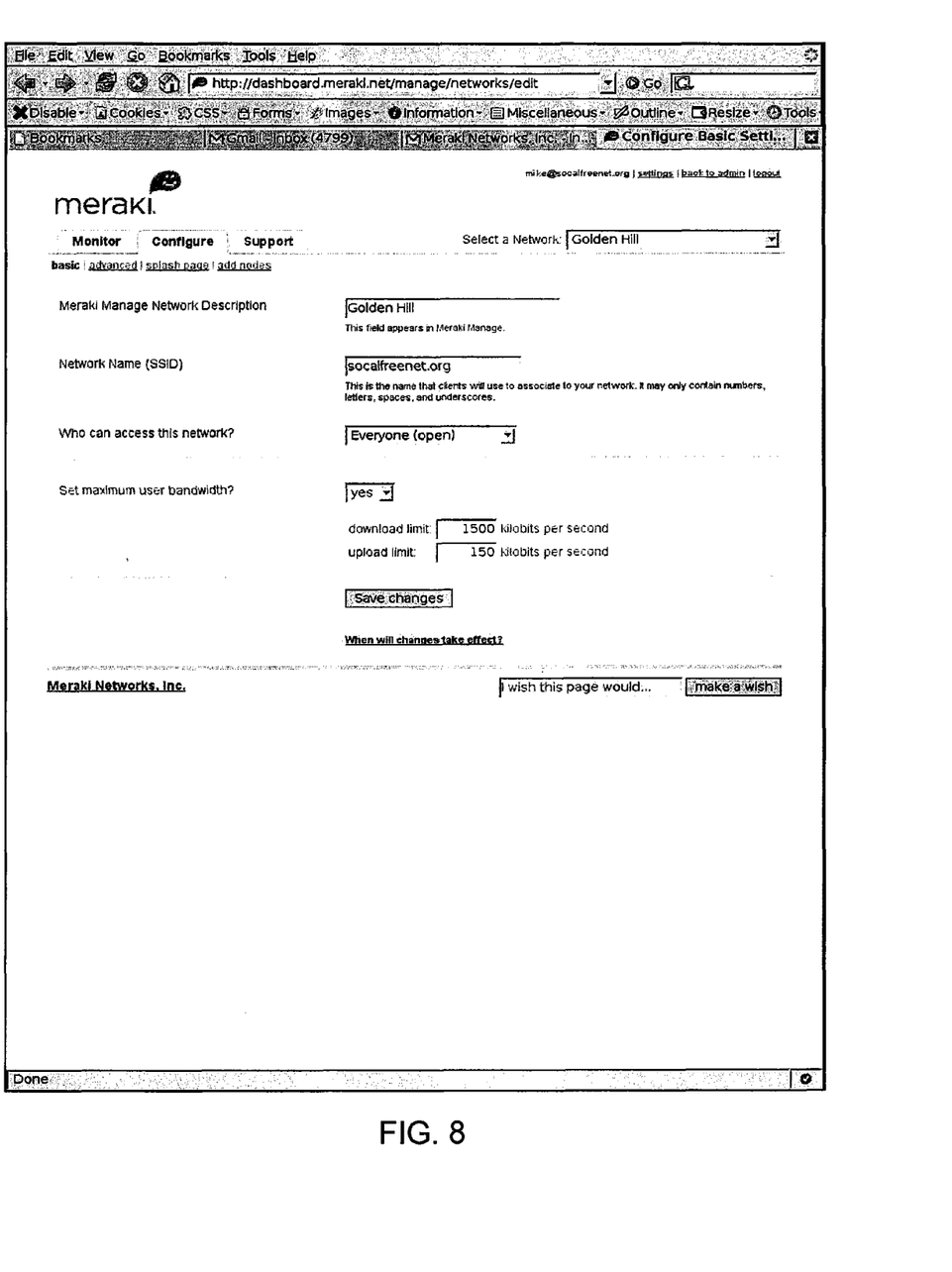
FIG. 8 is a management tool screenshot of a configuration view provided by the host illustrated in FIG. 1.

FIG. 8 is a screenshot representation of a management tool comprising a configuration page produced by the host 102. The network owner can use the configuration page after a login process with a Web portal of the host, using a conventional Web browser. The configuration page permits the network owner to enter configuration information and settings for the mesh network 110 that will be controlled and managed by the network owner. The FIG. 8 screenshot shows that various display pages can be selected via tabs corresponding to configure, access control, splash page, alerts, and any blocked user (client) devices. The configuration page enables the network owner to provide information the network name by which the network owner is known to the host, along with the network SSID information. The channel operation can also be provided. Any desired network passwords for client devices may be specified through access control inputs, if the managed network will not be operated as an open network but rather as a closed network. In the case of a closed network, each node will operate so as to block client devices from using the managed network unless appropriate login information is received that matches the access control information entered by the network owner through the configuration page of FIG. 8.

A variety of hardware configurations can be used for the devices described above. For example, conventional server and desktop computers can be used for the server host 102. In the illustrated embodiment, the server operates the Linux operating system. Other details of construction and operation will occur to those skilled in the art in view of the description herein. The nodes 106 can comprise routers, wireless access points, and suitably configured computer devices that might otherwise comprise clients 108 in the managed network. In the illustrated embodiment described herein, the nodes that process network traffic are specified as operating with the Linux operating system. Those skilled in the art will appreciate that a wide variety of device operating systems other than Linux can provide a suitable environment for execution of the operations described herein. Thus, any computer device that can perform the operations described herein can be utilized in a managed network system constructed in accordance with the invention.

Although the network communications have been described above in accordance with the Internet protocol (IP), it should be understood that a wide variety of network communication protocols can be accommodated in accordance with the invention. The operations described herein for the gateways routers 106 and client devices 108 can be performed by device firmware or by application software installed on the respective devices. All of the devices capable of network communications will include any necessary network interface components, as will be known to those skilled in the art. The programming such as firmware and application software for the operations described herein can be installed through conventional manufacturing and production processes and through typical program installation techniques for computer devices. For example, the programming can be installed from program media containing machine instructions that can be read from media such as CD or DVD optical disc devices such that when the instructions are executed by the computer device they will cause operation in accordance with the techniques described herein. Other sources of such programming include external program sources such as memory chips, floppy disks, thumb drives, flash memory, and the like that are received into reader devices such that the program instructions can be installed.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations that are within the scope of the attached claims should therefore be considered within the scope of the invention.

We claim:

1. A method of operating a network traffic device for communication using a network communication protocol, the method comprising:

allocating an internal Internet protocol (IP) address for the network traffic device, the network traffic device being one of a plurality of network traffic devices on local area networks (LANs) managed by a host server over a wide area network (WAN) representing the Internet, wherein each of the network traffic device operates as one of a gateway device and a wireless access point associated with one of the LANs, wherein the host server provides access to management tools for the network traffic devices, wherein at least some of the network traffic devices operate as network gateway devices that provide a gateway for their respective LANs to the WAN, wherein the host server maintains a persistent network connection with each of the network traffic devices to configure the respective network traffic devices and to receive reports from the respective network traffic devices, wherein the network traffic devices and the host server each have an internal IP address that is a private address for the persistent network connections over the WAN;

determining that the network traffic device will operate as a gateway device of a LAN that provides an interface between the LAN and the WAN, in response to initialization of a wired communication interface of the network traffic device and receiving a dynamic host configuration protocol (DHCP) response within a predetermined timeout period from a DHCP server in response to a DHCP request message transmitted by the network traffic device that requests assignment of a unique external IP address that is routable within the WAN, and otherwise determining that the network traffic device will operate as a wireless access point (AP) within the LAN;

obtaining an external IP address from the DHCP response for the network traffic device for communication with external devices in the WAN in response to determining that the network traffic device will operate as a gateway device;

scanning for neighbor network traffic devices operating in the LAN and maintaining a database of neighbor network traffic devices based on the scanning, wherein the neighbor network traffic devices are managed by the management server over the respective persistent network connections established using the respective internal IP addresses of the neighbor network traffic devices;

selecting one of the neighbor network traffic devices to join the LAN based on the database of neighbor network traffic devices in response to determining that the network traffic device will operate as a wireless AP to provide access of the LAN to one or more client devices;

establishing a persistent network connection between the network traffic device and the management server using the internal IP address;

downloading configuration data from the management server to configure the network traffic device over the persistent network connection;

reporting to the management server over the persistent network connection, wherein the plurality of network traffic devices and the management server form a managed network using their respective internal IP addresses, wherein allocating an internal IP network address comprises performing a hash function on a media access control (MAC) address of the network traffic device, wherein the hash function provides a hashed network address that is unique to the device and that is obtained identically each time the hash function is performed.

2. The method as defined in claim 1, wherein the internal IP address of the network traffic device is generated by the network traffic device itself by hashing its own MAC address without using a DHCP service, wherein lower 3 bytes of the MAC address of the network traffic device are hashed to generate lower 3 bytes of the internal IP address for the network traffic device.

3. The method as defined in claim 1, wherein scanning for neighbor devices comprises:

broadcasting a network management probe request message with service set identifier (SSID) equal to zero;

processing each response to the request message to determine information related to the responding device;

maintaining a database of the responding device information that includes channel of operation for the responding device, responding device MAC address, SSID, signal-to-noise information for communications to and from the responding device, a gateway indicator, a managed network indicator, and a gateway metric value.

4. The method as defined in claim 3, wherein selecting one of the network traffic devices to join comprises:

determining responding devices of the database that have a signal-to-noise ratio value that is greater than a threshold value to produce a filtered list;

identifying the responding device of the filtered list with the greatest gateway metric value;

operating on the channel associated with the identified responding device having the greatest gateway metric value, thereby joining the LAN of the identified responding device.

5. The method as defined in claim 1, further comprising:

periodically renewing a DHCP lease with the DHCP server if the network traffic device operates as a gateway device; and in response to a failure to renew the DHCP lease with the DHCP server, transitioning the network traffic device from operating as a gateway device to operating as a wireless AP by selecting one of the neighbor network traffic devices to join the LAN.

6. The method of claim 1, wherein the plurality of network traffic devices is associated with a network owner, and wherein the configuration data is received from an administrator associated with the network owner via the management tools of the management server.

7. The method of claim 1, further comprising:

receiving, at the network traffic device, a request form a client device to enter the LAN;

generating, by the network traffic device, an IP address for the client device by hashing using the hash function a MAC address of the client device, without using a DHCP function.

8. The method of claim 7, wherein each of the plurality of network traffic devices generates IP addresses for its client devices by hashing their respective MAC addresses using the same hash function without using a DHCP function, such that a client device can obtain the same IP address when roaming amongst the plurality of network traffic devices.

9. A network access device for communication using a network communication protocol, the network access device comprising:

a network interface for communications using the network communication protocol;

a processor coupled to the network interface to allocate an internal Internet protocol (IP) address, the network access device being one of a plurality of network access devices on local area networks (LANs) managed by a host server over a wide area network (WAN), wherein the host server provides access to management tools for the network access devices, wherein at least some of the network access devices operate as network gateway devices that provide a gateway for their respective LANs to the WAN representing the Internet, wherein each of the network traffic device operates as one of a gateway device and a wireless access point associated with one of the LANs, wherein the host server maintains a persistent network connection with each of the network access devices to configure the respective network access devices and to receive reports from the respective network access devices, wherein the network access devices and the host server each have an internal IP address that is a private address for the persistent network connections over the WAN, determine that the network access device will operate as a gateway of a LAN that provides an interface between the LAN and the WAN, in response to initialization of a wired communication interface of the network access device and receiving a dynamic host configuration protocol (DHCP) response within a predetermined timeout period from a DHCP server in response to a DHCP request message transmitted by the network access device that requests assignment of a unique external IP address that is routable within the WAN, and otherwise determines that the network access device will operate as a wireless access point (AP) within the LAN, obtain an external IP address from the DHCP respone for the network access device for communication with external devices in the WAN in response to determining that the network access device will operate as a gateway device, scan for neighbor network access devices operating in the LAN and maintain a database of neighbor network access devices based on the scanning, wherein the neighbor network traffic devices are managed by the management server over the respective persistent network connections established using the respective internal IP addresses of the neighbor network traffic devices, select one of the neighbor network access devices to join based on the database of neighbor network access devices in response to determining that the network access device will operate as a wireless AP to provide access of the LAN to one or more client devices, establishing a persistent network connection between the network traffic device and the management server using the internal IP address, downloading configuration data from the management server to configure the network traffic device over the persistent network connection, reporting to the management server over the persistent network connection, wherein the plurality of network traffic devices and the management server form a managed network using their respective internal IP addresses, wherein the network access device allocates an internal IP network address by performing a hash function on a media access control (MAC) address value of the network traffic device, wherein the hash function provides a hashed network address that is unique to the device and that is obtained identically each time the hash function is performed.

10. The network access device as defined in claim 9, wherein the internal IP address of the network access device is generated by the network access device itself by hashing its own MAC address without using a DHCP service, wherein lower 3 bytes of the MAC address of the network traffic device are hashed to generate lower 3 bytes of the internal IP address for the network traffic device.

11. The network access device as defined in claim 9, wherein the network access device scans for neighbor devices by broadcasting a network management probe request message with service set identifier (SSID) equal to zero, processing each response to the request message to determine information related to the responding device, and maintaining a database of the responding device information that includes channel of operation for the responding device, responding device MAC address, SSID, signal-to-noise information for communications to and from the responding device, a gateway indicator, a managed network indicator, and a gateway metric value.

12. The network access device as defined in claim 11, wherein the network access device selects one of the network access devices to join by determining responding devices of the database that have a signal-to-noise ratio value that is greater than a threshold value to produce a filtered list, identifying the responding device of the filtered list with the greatest gateway metric value, and operating on the channel associated with the identified responding device having the greatest gateway metric value, thereby joining the network of the identified responding device.

13. The method as defined in claim 9, wherein the network access device is configured to periodically renew a DHCP lease with the DHCP server if the network access device operates as a gateway device, and in response to a failure to renew the DHCP lease with the DHCP server, transition the network access device from operating as a gateway device to operating as a wireless AP by selecting one of the neighbor network traffic devices to join the LAN.

14. A non-transitory machine-readable storage medium having instructions stored therein, which when executed by a machine, cause the machine to perform a method, the method comprising:

allocating an internal Internet protocol (IP) address for the network traffic device, the network traffic device being one of a plurality of network traffic devices on local area networks (LANs) managed by a host server over a wide area network (WAN) representing the Internet, wherein each of the network traffic device operates as one of a gateway device and a wireless access point associated with one of the LANs, wherein the host server provides access to management tools for the network traffic devices, wherein at least some of the network traffic devices operate as network gateway devices that provide a gateway for their respective LANs to the WAN, wherein the host server maintains a persistent network connection with each of the network traffic devices to configure the respective network traffic devices and to receive reports from the respective network traffic devices, wherein the network traffic devices and the host server each have an internal IP address that is a private address for the persistent network connections over the WAN;

determining that the network traffic device will operate as a gateway device of a LAN that provides an interface between the LAN and the WAN, in response to initialization of a wired communication interface of the network traffic device and receiving a dynamic host configuration protocol (DHCP) response within a predetermined timeout period from a DHCP server in response to a DHCP request message transmitted by the network traffic device that requests assignment of a unique external IP address that is routable within the WAN, and otherwise determining that the network traffic device will operate as a wireless access point (AP) within the LAN;

obtaining an external IP address from the DHCP response for the network traffic device for communication with external devices in the WAN in response to determining that the network traffic device will operate as a gateway device;

scanning for neighbor network traffic devices operating in the LAN and maintaining a database of neighbor network traffic devices based on the scanning, wherein the neighbor network traffic devices are managed by the management server over the respective persistent network connections established using the respective internal IP addresses of the neighbor network traffic devices;

selecting one of the neighbor network traffic devices to join the LAN based on the database of neighbor network traffic devices in response to determining that the network traffic device will operate as a wireless AP to provide access of the LAN to one or more client devices;

establishing a persistent network connection between the network traffic device and the management server using the internal IP address;

downloading configuration data from the management server to configure the network traffic device over the persistent network connection;

reporting to the management server over the persistent network connection, wherein the plurality of network traffic devices and the management server form a managed network using their respective internal IP addresses, wherein allocating an internal IP network address comprises performing a hash function on a media access control (MAC) address of the network traffic device, wherein the hash function provides a hashed network address that is unique to the device and that is obtained identically each time the hash function is performed.

15. The non-transitory machine-readable storage medium as defined in claim 14, wherein the internal IP address of the network traffic device is generated by the network traffic device itself by hashing its own MAC address without using a DHCP service, wherein lower 3 bytes of the MAC address of the network traffic device are hashed to generate lower 3 bytes of the internal IP address for the network traffic device.

16. The non-transitory machine-readable storage medium as defined in claim 14, wherein scanning for neighbor devices comprises:

broadcasting a network management probe request message with service set identifier (SSID) equal to zero;

processing each response to the request message to determine information related to the responding device;

maintaining a database of the responding device information that includes channel of operation for the responding device, responding device MAC address, SSID, signal-to-noise information for communications to and from the responding device, a gateway indicator, a managed network indicator, and a gateway metric value.

17. The non-transitory machine-readable storage medium as defined in claim 16, wherein selecting one of the network traffic devices to join comprises:

determining responding devices of the database that have a signal-to-noise ratio value that is greater than a threshold value to produce a filtered list;

identifying the responding device of the filtered list with the greatest gateway metric value;

operating on the channel associated with the identified responding device having the greatest gateway metric value, thereby joining the LAN of the identified responding device.

18. The non-transitory machine-readable storage medium as defined in claim 14, wherein the method further comprises:

periodically renewing a DHCP lease with the DHCP server if the network traffic device operates as a gateway device; and in response to a failure to renew the DHCP lease with the DHCP server, transitioning the network traffic device from operating as a gateway device to operating as a wireless AP by selecting one of the neighbor network traffic devices to join the LAN.

* * * * *